US011555407B2

(12) United States Patent
Burdgick et al.

(10) Patent No.: US 11,555,407 B2
(45) Date of Patent: Jan. 17, 2023

(54) TURBOMACHINE ROTOR ASSEMBLY

(71) Applicant: General Electric Company, Schenectady, NY (US)

(72) Inventors: Steven Sebastian Burdgick, Schenectady, NY (US); John Ligos, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/877,541

(22) Filed: May 19, 2020

(65) Prior Publication Data
US 2021/0363890 A1 Nov. 25, 2021

(51) Int. Cl.
F01D 5/30 (2006.01)

(52) U.S. Cl.
CPC .............. F01D 5/30 (2013.01); F01D 5/3007 (2013.01); F05D 2230/10 (2013.01); F05D 2240/30 (2013.01)

(58) Field of Classification Search
CPC . F01D 5/30; F01D 5/3007; F01D 5/32; F01D 5/323; F01D 5/326; F05D 2230/10; F05D 2230/60; F05D 2240/30; Y10T 29/44945; Y10T 29/49321; Y10T 29/49954; B23P 15/006

(Continued)

(56) References Cited

U.S. PATENT DOCUMENTS 1,719,415 A * 7/1929 Back .................... F01D 5/3007
416/216
2,942,842 A 6/1960 Hayes
(Continued)

FOREIGN PATENT DOCUMENTS

EP 0110744 A1 6/1984
EP 0717168 A1 6/1996
(Continued)

OTHER PUBLICATIONS

European Search Report Corresponding to Application No. 21172158 dated Sep. 17, 2021.

Primary Examiner — Woody A Lee, Jr.
Assistant Examiner — Elton K Wong
(74) Attorney, Agent, or Firm — Dority & Manning, P.A.

(57) ABSTRACT

A rotor assembly includes a rotor having a dovetail slot. The dovetail slot includes a plurality of recesses and a first radially innermost surface. A rotor blade includes an airfoil that extends radially outward from a platform and a dovetail that extends radially inward from the platform. The dovetail includes a plurality of projections extending in opposite directions that are received by the plurality of recesses of the dovetail slot. The dovetail further includes a leading edge surface, a trailing edge surface, and a second radially innermost surface. The second radially innermost surface defines a groove from the leading edge surface to the trailing edge surface. The shim is positioned within the groove and between the first radially innermost surface of the dovetail slot and the second radially innermost surface of the dovetail. The shim extends at least partially radially along both of the leading edge surface and the trailing edge surface to secure the rotor blade within the dovetail slot during various operating conditions of the turbomachine.

16 Claims, 15 Drawing Sheets

(58) Field of Classification Search
USPC .......................................... 29/889.21, 525.05
See application file for complete search history.

(56) References Cited

U.S. PATENT DOCUMENTS

| | | | |
|---|---|---|---|
| 2,971,743 A | | 2/1961 | Welsh |
| 3,157,385 A | * | 11/1964 | Jenson .................. F01D 5/323 |
| | | | 416/221 |
| 3,556,675 A | | 1/1971 | Howald et al. |
| 4,466,776 A | | 8/1984 | Camboulives |
| 4,478,554 A | | 10/1984 | Surdi |
| 4,711,007 A | * | 12/1987 | Conrad .................. F01D 5/323 |
| | | | 29/525 |
| 5,236,309 A | | 8/1993 | Van Heusden et al. |
| 5,431,543 A | | 7/1995 | Brown et al. |
| 6,722,850 B2 | | 4/2004 | Burdgick |
| 6,832,892 B2 | | 12/2004 | Murphy et al. |
| 6,893,224 B2 | | 5/2005 | Murphy |
| 8,821,127 B1 | | 9/2014 | Knecht |
| 8,851,854 B2 | | 10/2014 | Alexander |
| 8,870,545 B2 | | 10/2014 | Reghezza et al. |
| 8,992,180 B2 | | 3/2015 | Agaram et al. |
| 9,739,160 B2 | | 8/2017 | Kain et al. |
| 9,909,431 B2 | | 3/2018 | Polyzopoulos et al. |
| 10,400,614 B2 | | 9/2019 | Burdgick et al. |
| 10,465,537 B2 | | 11/2019 | Burdgick et al. |
| 2004/0239040 A1 | | 12/2004 | Burdgick |
| 2005/0254951 A1 | | 11/2005 | Thenaisie et al. |
| 2006/0275125 A1 | | 12/2006 | Bibor et al. |
| 2007/0119174 A1 | | 5/2007 | Russo |
| 2008/0253895 A1 | | 10/2008 | Gekht et al. |
| 2009/0022599 A1 | | 1/2009 | Beulick |
| 2009/0060745 A1 | | 3/2009 | Douguet et al. |
| 2010/0014986 A1 | | 1/2010 | Traverso |
| 2010/0189564 A1 | | 7/2010 | Stone |
| 2010/0226777 A1 | | 9/2010 | Forgue et al. |
| 2011/0014053 A1 | | 1/2011 | Eastman et al. |
| 2012/0034086 A1 | | 2/2012 | Mishrikotkar |
| 2012/0107125 A1 | | 5/2012 | Reghezza et al. |
| 2013/0170996 A1 | | 7/2013 | Farineau |
| 2013/0330198 A1 | | 12/2013 | Farineau |
| 2013/0330204 A1 | | 12/2013 | Farineau |
| 2014/0079559 A1 | | 3/2014 | Luczak |
| 2014/0127026 A1 | | 5/2014 | Farineau |
| 2015/0110635 A1 | | 4/2015 | Kain et al. |
| 2015/0167469 A1 | | 6/2015 | Deallenbach |
| 2015/0167471 A1 | | 6/2015 | Deallenbach |
| 2015/0176417 A1 | | 6/2015 | Zelmer |
| 2015/0330235 A1 | * | 11/2015 | Polyzopoulos ......... F01D 5/323 |
| | | | 416/221 |
| 2017/0074107 A1 | * | 3/2017 | Neville .................. F01D 5/147 |
| 2017/0298778 A1 | | 10/2017 | Twell |
| 2018/0087388 A1 | | 3/2018 | Kalochairetis |
| 2018/0142561 A1 | * | 5/2018 | Burdgick ............... F01D 5/323 |
| 2019/0063229 A1 | | 2/2019 | Gamer |
| 2019/0120069 A1 | * | 4/2019 | Burdgick ............... F01D 5/323 |

FOREIGN PATENT DOCUMENTS

| | | |
|---|---|---|
| EP | 2439378 A2 | 4/2012 |
| EP | 2642077 A1 | 9/2013 |
| GB | 2038959 A | 7/1980 |
| WO | WO2013/090742 A1 | 6/2013 |
| WO | WO2020/102615 A1 | 5/2020 |
| WO | WO2020/102617 A1 | 5/2020 |

* cited by examiner

TURBOMACHINE ROTOR ASSEMBLY

FIELD

The present disclosure relates generally to turbomachines. Specifically, present disclosure relates to support and/or retention of rotor blades in turbomachines.

BACKGROUND

Turbomachines, such as steam turbines, often include static nozzle assemblies that direct flow of a working fluid into rotor blades connected to a rotating rotor. The nozzle construction (including a plurality of nozzles, or "airfoils") is sometimes referred to as a "diaphragm" or "nozzle assembly stage." Each rotor blade includes a base with a dovetail that is sized to fit within a corresponding dovetail slot in the rotor. Many last stage rotor blades are of significant length and have a substantial weight. During low speed operation or "turning gear" operation, the blades have the ability to move within the dovetail slots in which they are retained. This undesirable movement can cause significant wear on the blade and/or the rotor dovetail slots. In many cases, wear on the blades and dovetail slots can cause outages, require repairs, and result in undesirable costs.

However, during rotor assembly, it is required to have some movement ("fanning") of the rotor blades to facilitate assembly of the rotor blades. The rotor blades have outer cover ends, and these typically have interlocking features. The rotor blades must pass each other during row assembly. The rotor blades may also overlap airfoils such that assembly of the last rotor blades in the row may be difficult, if not impossible, to assemble if adequate movement does not exist.

Accordingly, an improved system and method for rotor blade installation is desired in the art. In particular, an improved system and method for rotor blade installation that allows for adequate clearance during assembly while maintaining proper restraint of the rotor blade during operation of the turbomachine is desired.

BRIEF DESCRIPTION

Aspects and advantages of the present rotor assemblies, turbomachines, and methods of installing a plurality of rotor blades in a rotor assembly in accordance with the present disclosure will be set forth in part in the following description, or may be obvious from the description, or may be learned through practice of the technology.

In accordance with one embodiment, a rotor assembly is provided. The rotor assembly includes a rotor having a dovetail slot. The dovetail slot includes a plurality of recesses and a first radially innermost surface. The rotor assembly further includes a shim and a rotor blade having a platform. An airfoil extends radially outward from the platform, and a dovetail extends radially inward from the platform. The dovetail includes a plurality of projections that extend in opposite directions and that are received by the plurality of recesses of the dovetail slot. The dovetail further includes a leading edge surface, a trailing edge surface, and a second radially innermost surface. The dovetail further includes a groove defined along the second radially innermost surface from the leading edge surface to the trailing edge surface. The shim is positioned within the groove and between the first radially innermost surface of the dovetail slot and the second radially innermost surface of the dovetail. The shim extends at least partially radially along both of the leading edge surface and the trailing edge surface.

In accordance with another embodiment, a turbomachine is provided. The turbomachine includes at least one turbine section, a rotor shaft that extends axially through the at least one turbine section, and a rotor assembly that is coupled to the rotor shaft. The rotor assembly includes a rotor having a dovetail slot. The dovetail slot includes a plurality of recesses and a first radially innermost surface. The rotor assembly further includes a shim and a rotor blade having a platform. An airfoil extends radially outward from the platform, and a dovetail extends radially inward from the platform. The dovetail includes a plurality of projections that extend in opposite directions and that are received by the plurality of recesses of the dovetail slot. The dovetail includes a leading edge surface, a trailing edge surface, and a second radially innermost surface. The dovetail further includes a groove defined along the second radially innermost surface from the leading edge surface to the trailing edge surface. The shim is positioned within the groove and between the first radially innermost surface of the dovetail slot and the second radially innermost surface of the dovetail. The shim extends at least partially radially along both of the leading edge surface and the trailing edge surface.

In accordance with yet another embodiment, a method of installing a plurality of rotor blades in a rotor assembly is provided. The method includes machining a first recessed corner and a second recessed corner onto a dovetail of each rotor blade of the plurality of rotor blades. The first recessed corner is defined at an intersection between a leading edge surface of the dovetail and a radially innermost surface of the dovetail. The second recessed corner is defined at an intersection between a trailing edge surface of the dovetail and the radially innermost surface. The method further includes engaging the dovetail of each rotor blade into a corresponding dovetail slot defined within a rotor. A groove is defined between the radially innermost surface of the dovetail and the radially innermost surface of the dovetail slot. The method further includes inserting a shim into groove until a first end of the shim extends axially beyond the trailing edge face and a second end of the shim extends axially beyond the leading edge face. The method further includes bending the first end of the shim around the second recessed corner and bending the second end of the shim around the first recessed corner.

These and other features, aspects and advantages of the present rotor assemblies, turbomachines, and methods of installing a plurality of rotor blades in a rotor assembly will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present rotor assemblies, turbomachines, and methods of installing a plurality of rotor blades in a rotor assembly, including the best mode of making and using the present systems and methods, directed to one of ordinary skill in the art, is set forth in the specification, which makes reference to the appended figures, in which.

DETAILED DESCRIPTION

Figure 1:
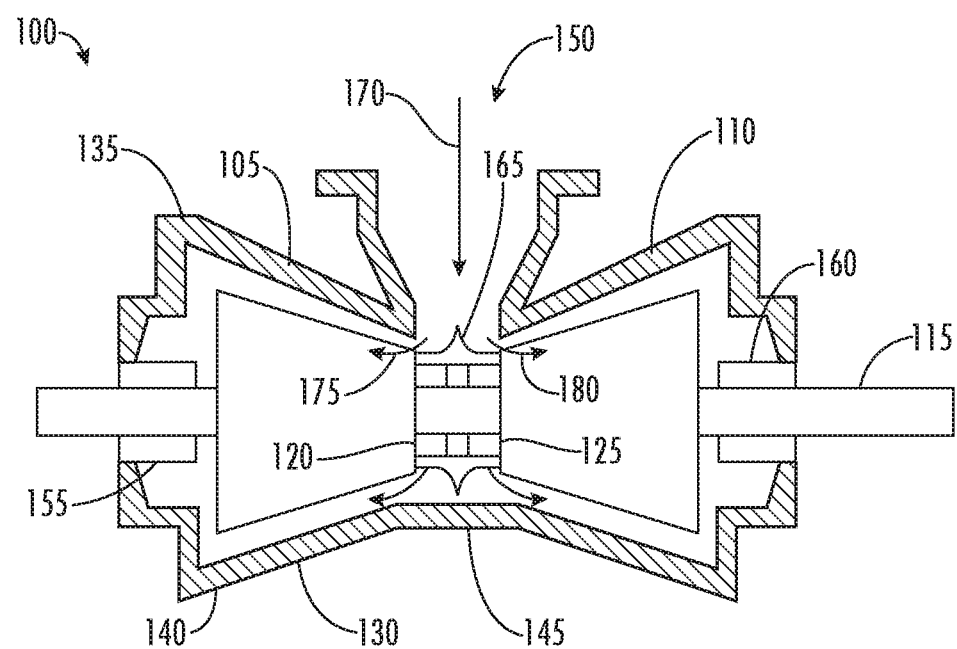
FIG. 1 is a schematic illustration of a turbomachine in accordance with embodiments of the present disclosure.
Figure 1:
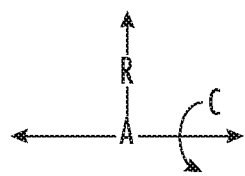

Reference now will be made in detail to embodiments of the present rotor assemblies, turbomachines, and methods of installing a plurality of rotor blades in a rotor assembly, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "generally," "substantially," "approximately," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring to the drawings, FIG. 1 shows a schematic diagram of an exemplary opposed-flow steam turbine 100. Although an exemplary steam turbine is shown and described herein, the present disclosure is not limited to such embodiment or to a steam turbine unless otherwise specified in the claims. For example, the invention as described herein may be used in any type of turbomachine including, but not limited to, an industrial or land-based gas turbine, an aircraft gas turbine, or a marine gas turbine. As shown in FIG. 1, the steam turbine 100 may define an axial direction A and a circumferential direction C which extends around the axial direction A. The steam turbine 100 may also define a radial direction R perpendicular to the axial direction A.

As shown in FIG. 1, steam turbine 100 may include a first low pressure (LP) section 105 and a second LP section 110. Each LP section 105 and 110 may include a plurality of stages of diaphragms (not shown in FIG. 1). In one embodiment, each LP section 105 and 110 may include eight or more stages arranged adjacent to one another in the axial direction A. The last four stages in the axial direction A or "margin stages" are referred to as L0, L1, L2, and L3 stages. The rotor blades of the L3 stage are the smallest in the radial direction R, and the size in the radial direction R of the rotor blades in the remaining margin stages L2, L1, and L0 progressively increases from stage to stage in the axial direction A.

The L3 stage is the first stage of the margin stages in the axial direction A and the smallest in the radial direction R of the margin stages. The L2 stage is the third to last stage and is the next stage in the axial direction A. The L1 stage is next to last stage of the four margin stages. The L0 stage is the last stage and is the largest in a radial direction R. It is to be understood that four stages are described as one example only, and LP sections 105 and 110 can have more or less than four margin stages.

A rotor shaft 115 extends through LP sections 105 and 110. Each LP section 105 and 110 may include a nozzle 120 and 125, respectively. A single outer shell or casing 130 may be divided along a horizontal plane and axially into upper and lower half sections 135 and 140, respectively. The single outer shell or casing 130 may span both LP sections 105 and 110. A central section 145 of shell 130 includes a low pressure steam inlet 150. Within outer shell or casing 130, LP sections 105 and 110 are arranged in a single bearing span supported by journal bearings 155 and 160. A flow splitter 165 extends between LP sections 105 and 110.

During operation, low pressure steam inlet 150 receives low pressure/intermediate temperature steam 170 from a source, such as, but not limited to, a high pressure (HP) turbine or an intermediate (IP) turbine through a cross-over pipe (not shown). Steam 170 is channeled through inlet 150 wherein flow splitter 165 splits the steam flow into two opposite flow paths 175 and 180. More specifically, in the exemplary embodiment, steam 170 is routed through LP sections 105 and 110 in which work is extracted from the steam to rotate rotor shaft 115. The steam exits LP sections 105 and 110 where it is routed for further processing (e.g., to a condenser).

It should be noted that although FIG. 1 illustrates an opposed-flow, low pressure turbine, as will be appreciated by one of ordinary skill in the art, the systems and methods of the present disclosure are not limited to being used only with LP turbines and can be used with any opposed-flow turbine including, but not limited to, IP turbines and/or HP turbines. In addition, the systems and methods of the present disclosure are not limited to only being used with opposed-flow turbines, but rather may also be used with other turbine types (e.g., single flow steam turbines).

Figure 2:
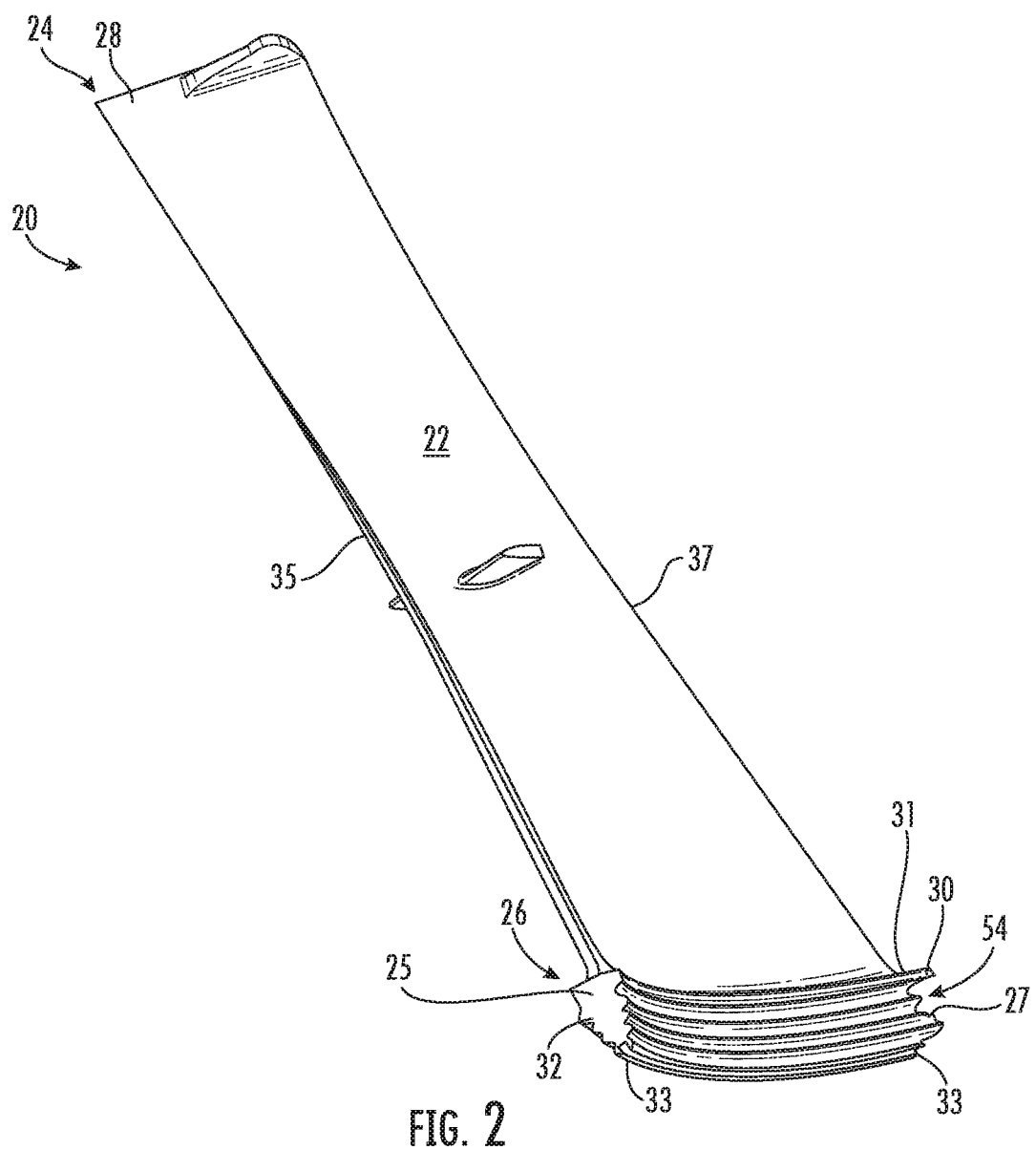
FIG. 2 illustrates a rotor blade in accordance with embodiments of the present disclosure.
Figure 6:
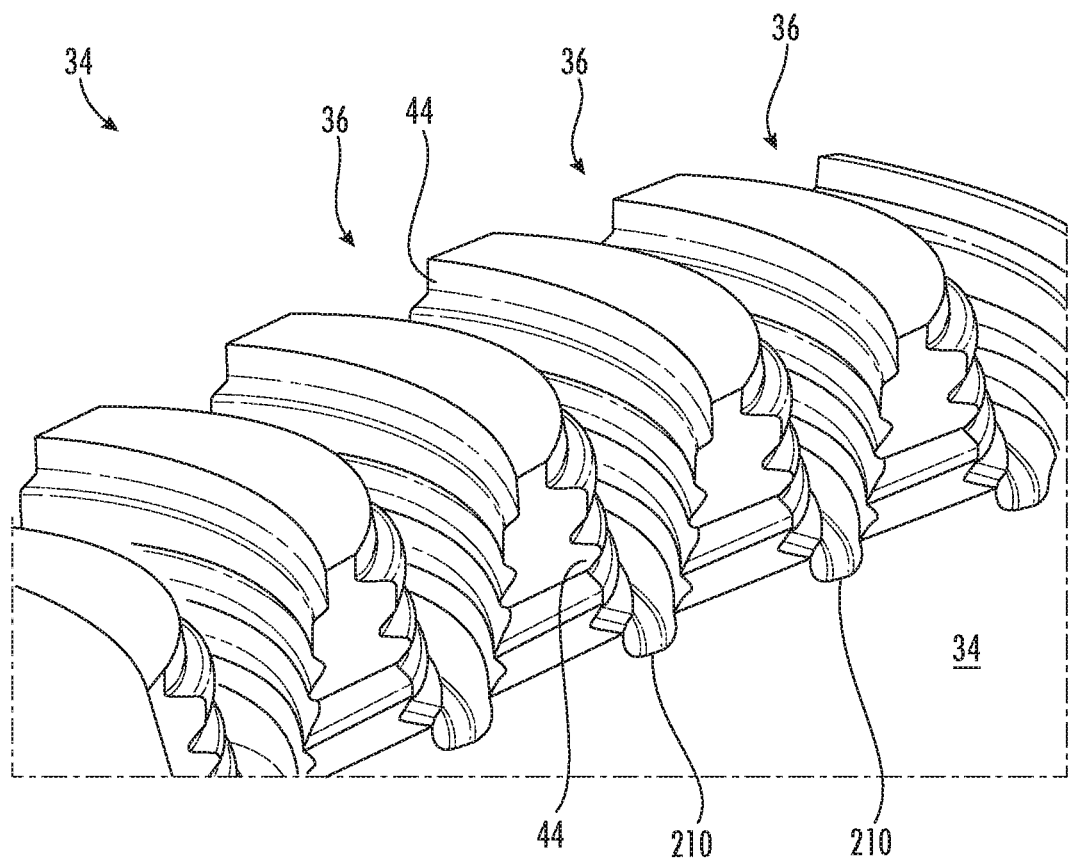
FIG. 6 illustrates an enlarged perspective view of a rotor showing the dovetail slots decoupled from the rotor blade dovetail in accordance with embodiments of the present disclosure.

FIG. 2 shows a schematic perspective view of a steam turbine rotor blade 20, e.g., within the L1 stage or L0 stage, according to various embodiments of the disclosure. As shown, steam turbine rotor blade 20 may include a blade or airfoil 22 having a leading edge 35, a trailing edge 37, a radially outer first end 24, and a radially inner second end 26 opposite first end 24. First end 24 of airfoil 22 can include a tip 28, which may be coupled to a shroud (not shown) in some embodiments. At second end 26 of airfoil 22 is a base 30, which includes a dovetail 32 for engaging with and complementing a corresponding dovetail slot 36 in a rotor 34 (FIG. 6).

The rotor blade 20 may further include a platform 31 that generally surrounds the dovetail 32 and the airfoil 22. A typical platform may be positioned at an intersection or transition between the airfoil 22 and the dovetail 32 and may extend outwardly in the generally axial and tangential directions, as shown. In various embodiments, the airfoil 22 may extend radially outward from the platform 31 and the dovetail 32 may extend radially inward from the platform 31. In many embodiments, the platform 31 generally serves as a radially inward flow boundary for the working fluid flowing through the steam path.

As shown in FIG. 2, a groove or tapered groove 33 may extend along the radially inner portion of the dovetail 32. The dovetail 32 may extend between a leading edge face 25 radially inward from the leading edge 35 and a trailing edge face 27 radially inward from the trailing edge 37. The trailing edge face 27 may include a retention feature 54, discussed further herein.

In some embodiments, the tapered groove 33 may be deeper (i.e., extends radially deeper into the dovetail) near the leading edge face 25, and the depth of the groove 33 gradually reduces as it extends along the dovetail 32 to the trailing edge face 27. As one non-limiting example, the depth of the tapered groove 33 near the leading edge face 25 may be about 0.30 inches and the depth of the groove 33 near the trailing edge face 27 may be about 0.12 inches. In other embodiments, the depth of the tapered groove 33 near the leading edge face 25 may be between about 0.20 inches and about 0.40 inches. Likewise, in some embodiments, the depth of the groove 33 near the trailing edge face may be between about 0.08 inches and about 0.16 inches.

Figure 3:
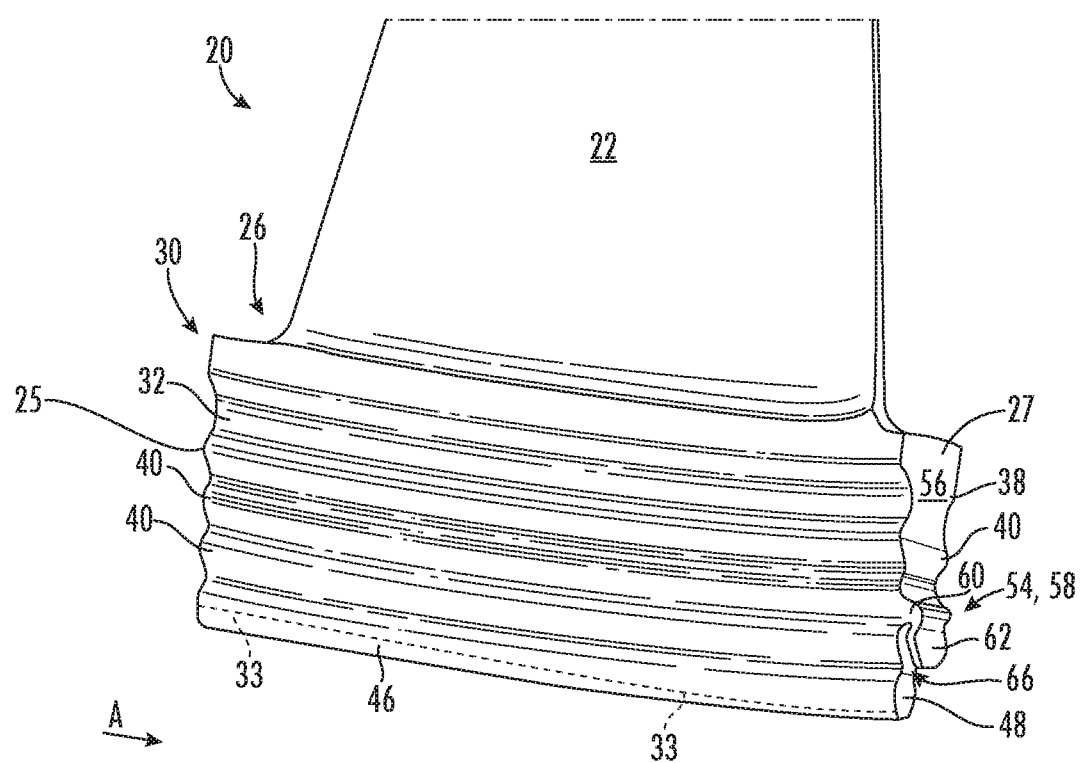
FIG. 3 illustrates an enlarged perspective view of a rotor blade in accordance with embodiments of the present disclosure.
Figure 7:
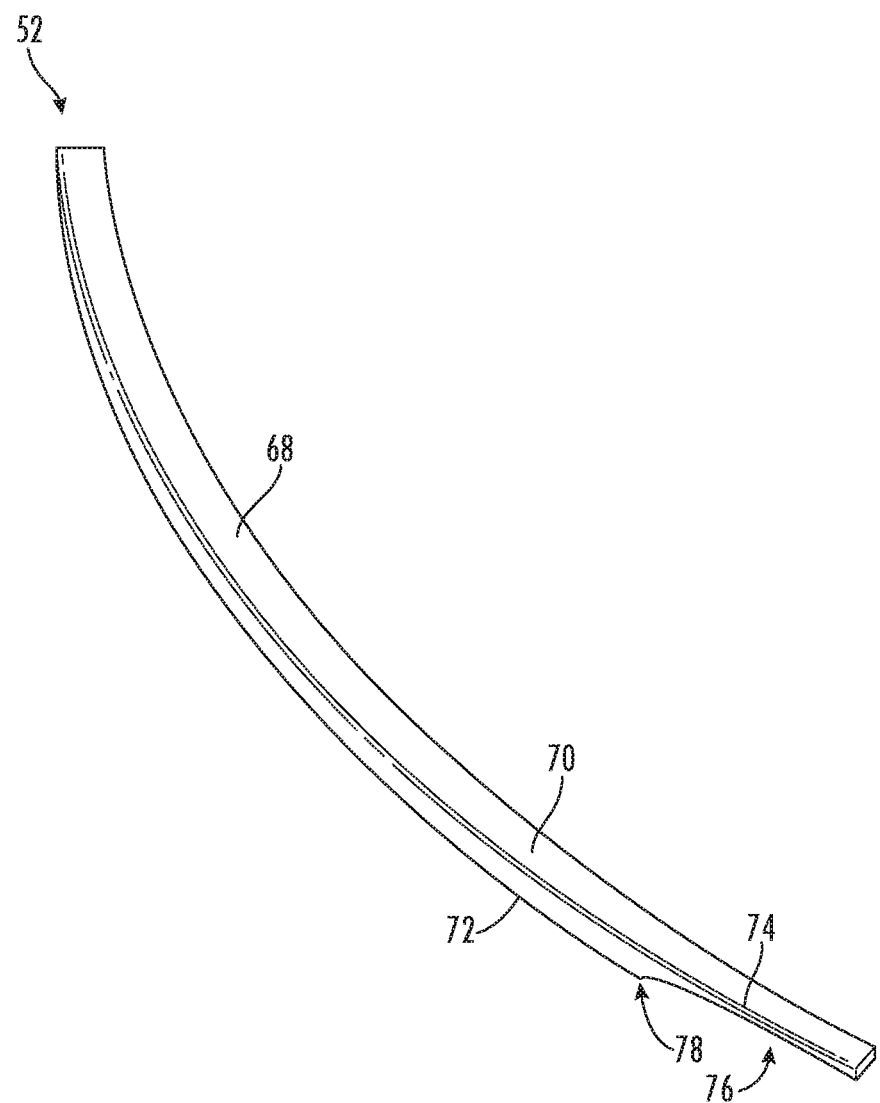
FIG. 7 illustrates a perspective view of a shim in accordance with embodiments of the present disclosure.
Figure 12:
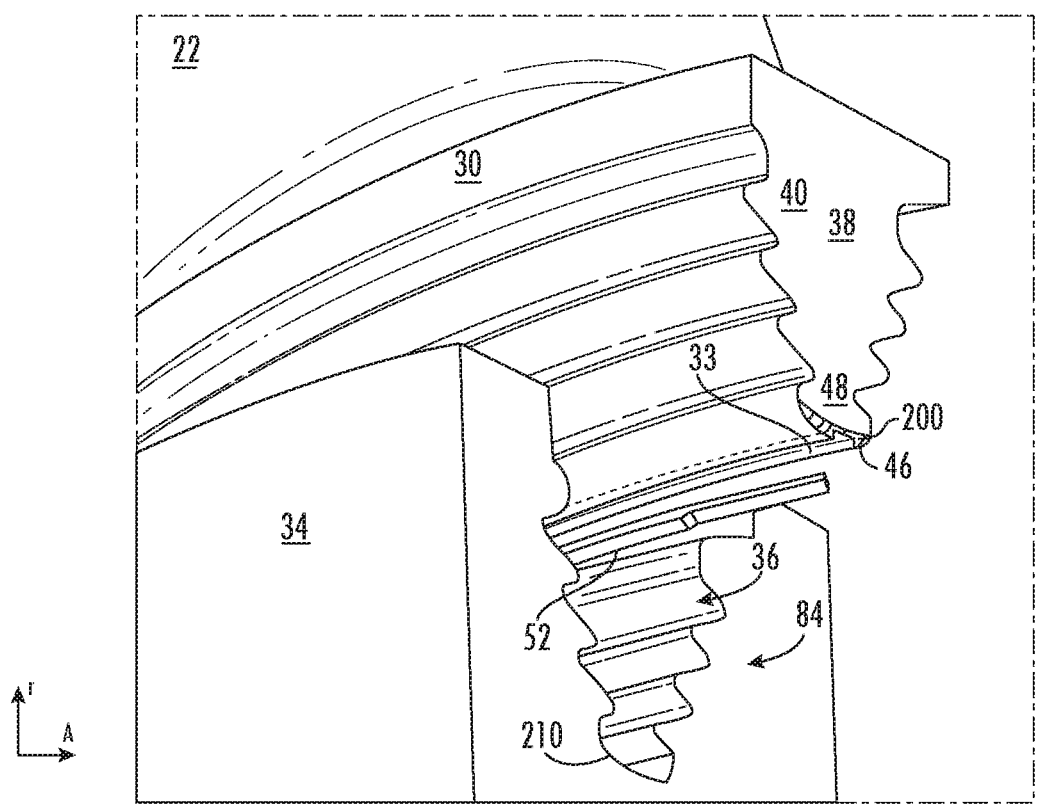
FIG. 12 illustrates a perspective blown-out view of a rotor blade dovetail, a shim, and a cut-away rotor in accordance with embodiments of the present disclosure.

FIG. 3 illustrates an enlarged perspective view of a portion of the steam turbine rotor blade 20. As shown, the dovetail 32 may include a main body 38, a plurality of projections 40 extending from the main body 38 in opposing directions, a radially innermost surface 46, and a tapered groove 33 extending within the radially innermost surface 46 along the length of the dovetail 32. The plurality of projections 40 are sized to complement a plurality of recesses 44 in the corresponding dovetail slot 36 (FIG. 12). In various embodiments, tapered groove 33 is open at the radially innermost surface 46 and is sized to engage a shim 52 (FIG. 7, in a manner shown in FIG. 12). Tapered groove 33 extends along the entirety of the radially innermost surface 46 of the main body 38. In various embodiments, main body 38 includes a bulbous section 48 for complementing one of the plurality of recesses 44 in dovetail slot 36.

Figure 4:
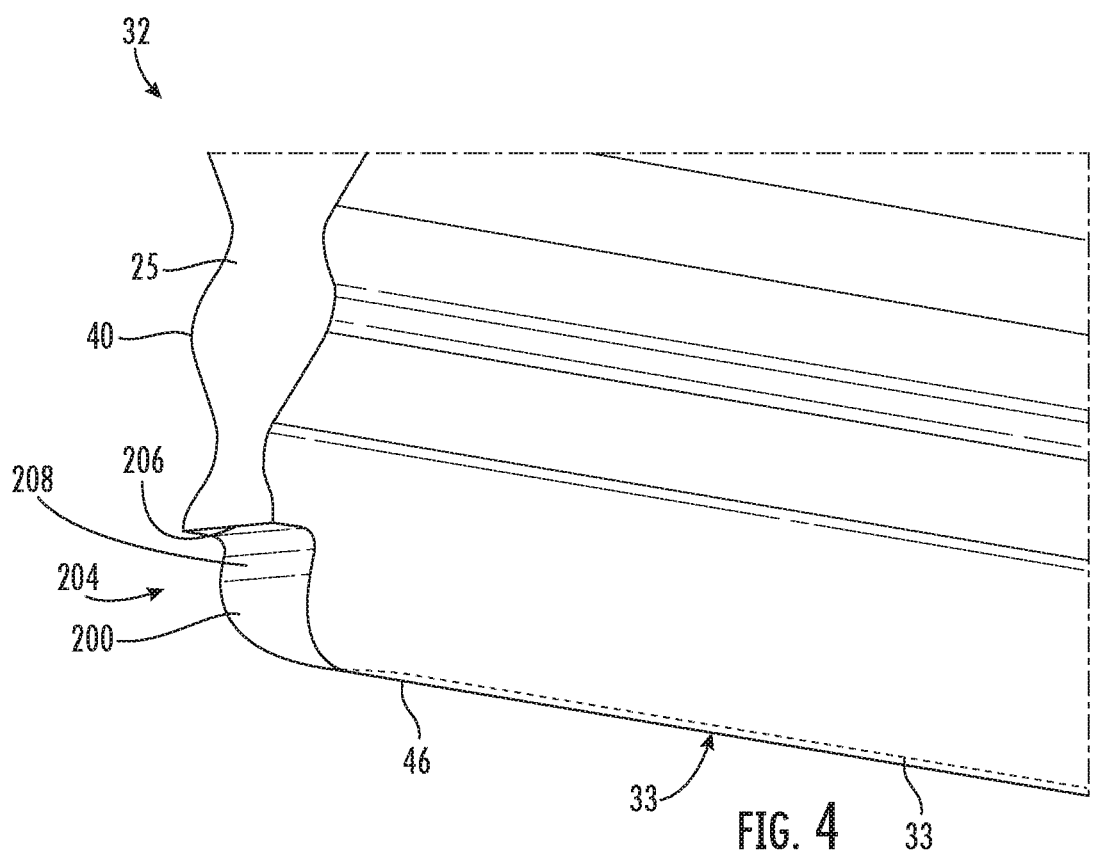
FIG. 4 illustrates an enlarged perspective view of a rotor blade dovetail in accordance with embodiments of the present disclosure.
Figure 5:
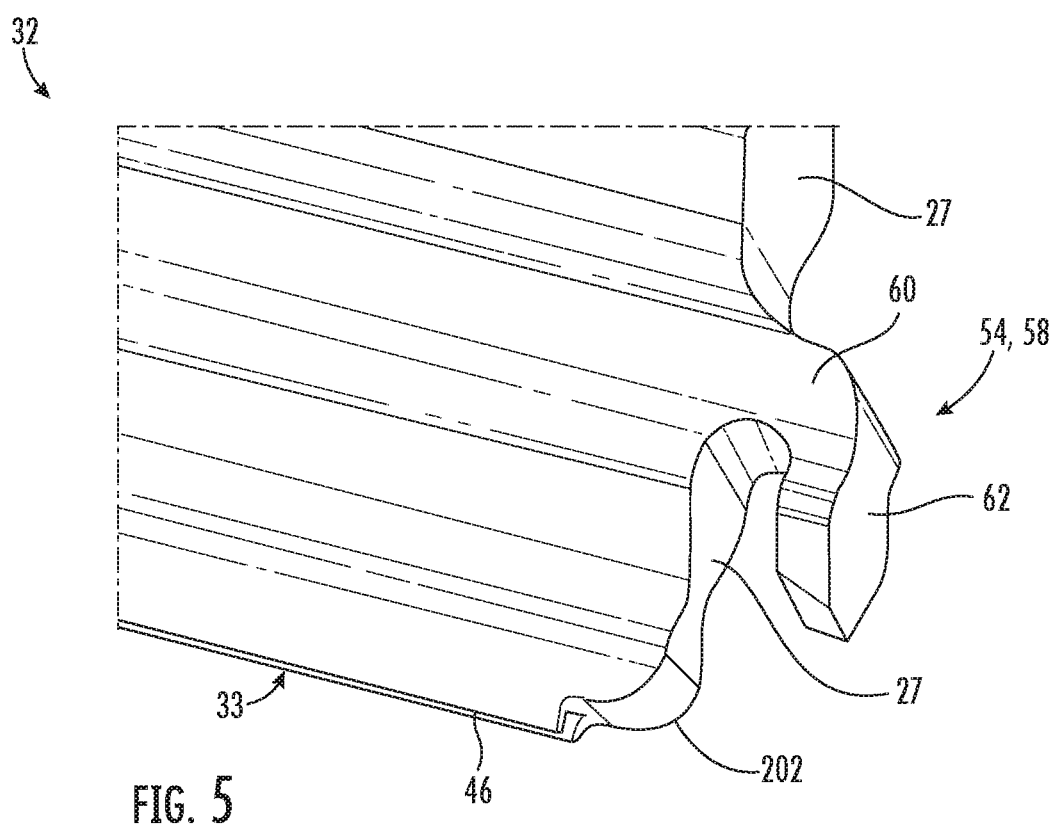
FIG. 5 illustrates an enlarged perspective view of a rotor blade dovetail in accordance with embodiments of the present disclosure.

FIG. 4 illustrates an enlarged perspective view of the leading edge surface 25 of a dovetail 32 in accordance with embodiments of the present disclosure. Similarly, FIG. 5 illustrates an enlarged perspective view of the trailing edge surface 27. As shown, the dovetail 32 may further include a first corner 200 defined at an intersection between the leading edge surface 25 and the radially innermost surface 46 of the dovetail 32. Likewise, a second corner 202 may be defined at an intersection between the trailing surface 27 and the radially innermost surface 46. As shown in FIGS. 4 and 5, the first corner 200 and the second corner 202 may be arcuate and/or generally smooth curved surfaces. In many embodiments, the first corner 200 and second corner 202 may function at least partially to provide a smooth surface for the ends of the shim 52 to be bent around without causing the shim 52 to crack and/or break.

As shown in FIG. 4 the first corner 200, and/or the second corner 202 in some embodiments, may include an axial recess 204 relative to the leading edge surface 25. In particular, the axial recess 204 may include an axially extending portion 206 and a radially extending portion 208 that intersect with one another. Specifically, the axially extending portion 206 may be generally perpendicular to the leading edge surface 25 and may extend between the leading edge surface 25 and the radially extending portion 208. The radially extending portion 208 may be generally parallel to the leading edge face 25 and may extend between the axially extending portion 206 and the first corner 200 and/or the radially innermost surface 46. The radially extending portion 208 of the axial recess 204 may be disposed axially inward from the leading edge surface 25. Although not shown in FIG. 5, in many embodiments, the second corner 202 may also include an axial recess 204 relative to the trailing edge surface 27.

FIG. 6 illustrates a rotor 34 (e.g., a steam turbine rotor) including a plurality of dovetail slots 36 for coupling with dovetails 32 of rotor blades 20. Each dovetail slot 36 of the plurality of dovetail slots 36 includes a plurality of recesses 44 which may be sized to receive the plurality of projections 40 extending from each dovetail 32. Further, as shown in FIG. 6, each dovetail slot 36 may include a radially innermost surface 210. The radially innermost surface 210 of the dovetail slot 36 may contact either one or both of the radially innermost surface 46 of the dovetail 32 and/or the shim 52 when the dovetail 32 is installed in the dovetail slot 36.

Figure 8:
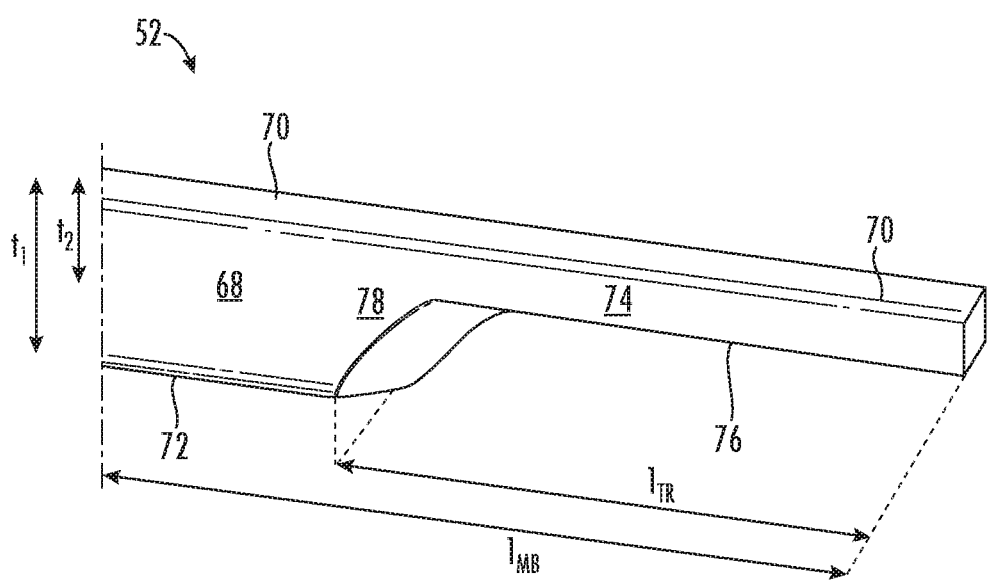
FIG. 8 illustrates an enlarged perspective view of a shim in accordance with embodiments of the present disclosure.

FIG. 7 and FIG. 8 illustrate shim 52 in greater detail. In various embodiments, shim 52 may be sized to engage tapered groove 33 in rotor blade 20 and functions to retain rotor blade 20 within dovetail slot 36. In many embodiments, shim 52 may include a main body 68 having a first thickness ($t_1$) measured between an upper surface or radially outer surface 70 and a lower surface or first radially inner surface 72 of the main body 68. A thinned region 74 may extend from one end of main body 68 (e.g., the thicker end of shim 52) and may include a second thickness ($t_2$) measured between radially outer surface 70 (which is continuous between main body 68 and thinned region 74) and a thinned radially inner surface or second radially inner surface 76.

In some embodiments, the second thickness ($t_2$) is between about 5 percent to about 70 percent of the first thickness ($t_1$). In other embodiments, the second thickness ($t_2$) is between about 15 percent to about 60 percent of the first thickness ($t_1$). In many embodiments, the second thickness ($t_2$) is between about 25 percent to about 50 percent of the first thickness ($t_1$). In various embodiments, the second thickness ($t_2$) is between about 35 percent to about 45 percent of the first thickness ($t_1$). Connecting main body 68 and thinned region 74 is a first tapered region 78, which is tapered outward from main body 68 to thinned region 74. In various embodiments, thinned region 74 can have a length ($l_{TR}$) equal to approximately one-quarter of a length ($l_{MB}$) of main body 68, or one-eighth of a length of the main body 68, or three-sixteenths of a length of the main body 68, or between about 10% and about 25% of the length of the main body 68.

In many embodiments, when the shim 52 is installed between a rotor 34 and a rotor blade 20, the radially outer surface 70 may be in contact with the rotor blade 20, and the first radially inner surface 72 may be in contact with the rotor 34 to advantageously retain the rotor blade 20 within the dovetail slot 36. It is understood that shim 52 can be inserted in either a forward or aft direction into the tapered groove 33, depending upon clearances and desired installation techniques.

As described herein, shim 52 is configured to fit in tapered groove 33 and between dovetail 32 of rotor blade 20 and dovetail slot 36 of rotor 34 and to aid in retaining rotor blade 20 within rotor 34. Further, in various embodiments, thinned region 74 enhances ease of installation and removal of shim 52 within the tight clearances of the steam turbine. That is, thinned region 74 may permit flexing of shim 52 or bending over of an end of the shim 52 to lock the shim to rotor 34, e.g., bending the ends of the shim 52 over the first corner 200 and second corner 202 (FIGS. 4 and 5).

The thinned region 74 is preferably located on the thicker end of the shim 52, as the thicker end would be more difficult to bend over than the opposing thinner end. The region 74 is thinned to assure proper bend to thickness ratio such that cold working will not result in cracking or a high residual stressed area. The reduced thickness facilitates bending over a portion of the shim 52 to lock it to the rotor 34, and the opposing end portion near the thin end can also be bent over in a similar manner to lock the shim 52 to rotor 34.

An important reason the bend-over is required at the thick end is because during operation the radial gap between the rotor dovetail bottom 210 and the blade dovetail bottom 46 can increase due to mechanical growth. This radial gap would allow the wedge or shim to move towards the thin end during operation and then during shut down the radial gap would return to normal height. As the wedge/shim may have move forward and filled the larger gap there would be no room during shut-down for the blade to return to a non-stressed state. The radial gap being filled would result in excessive compression of the wedge/shim such that stresses could be beyond yield and/or disassembly of the wedge and it would be virtually impossible to remove the wedge/shim due to extremely high compression loading.

Figure 9:
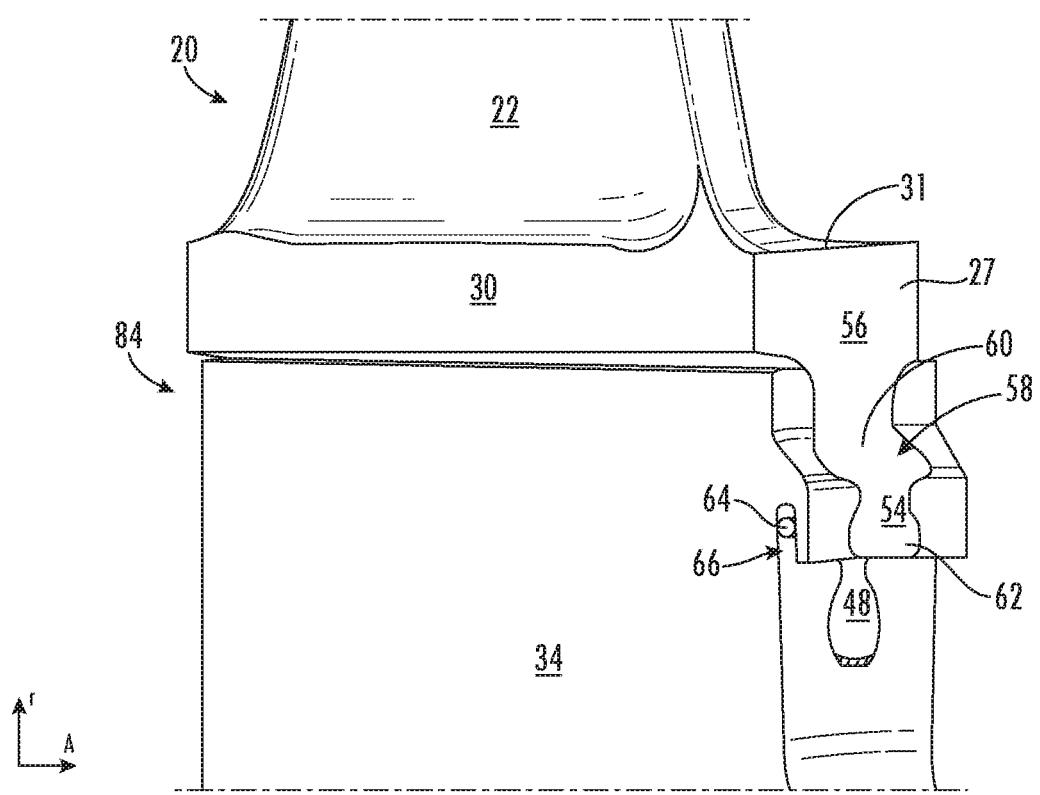
FIG. 9 illustrates a cut-away depiction of a rotor blade engaged with a rotor in accordance with embodiments of the present disclosure.

FIG. 9 illustrates a cut-away depiction of rotor blade 20 engaged with a rotor 34, and a portion of an axial retention member 64 within space 66 for axially retaining rotor blade 20 within rotor 34. As shown in FIG. 9, rotor blade 20 may further include an axial retention feature 54 extending from a side 56 of body 38. In many embodiments, the side 56 may be the leading edge surface 25, the trailing edge surface 27, or both. However, in the embodiment shown in FIG. 9, the axial retention feature extends from the trailing edge surface 27. In many embodiments, axial retention feature 54 may include a hook 58 having a first member 60 extending generally perpendicular from the trailing edge face 27 and a second member 62 extending from first member 60 generally parallel to the trailing edge face 27. As described further herein, axial retention feature 54 may function to provide a space in which the axial retention member 64 may fit to axially retain the dovetail 32 within the dovetail slot 36. In various embodiments, axial retention feature 54 defines a space 66 between the second member 62 and the trailing edge face 27 that is sized to engage the axial retention member 64.

Figure 10:
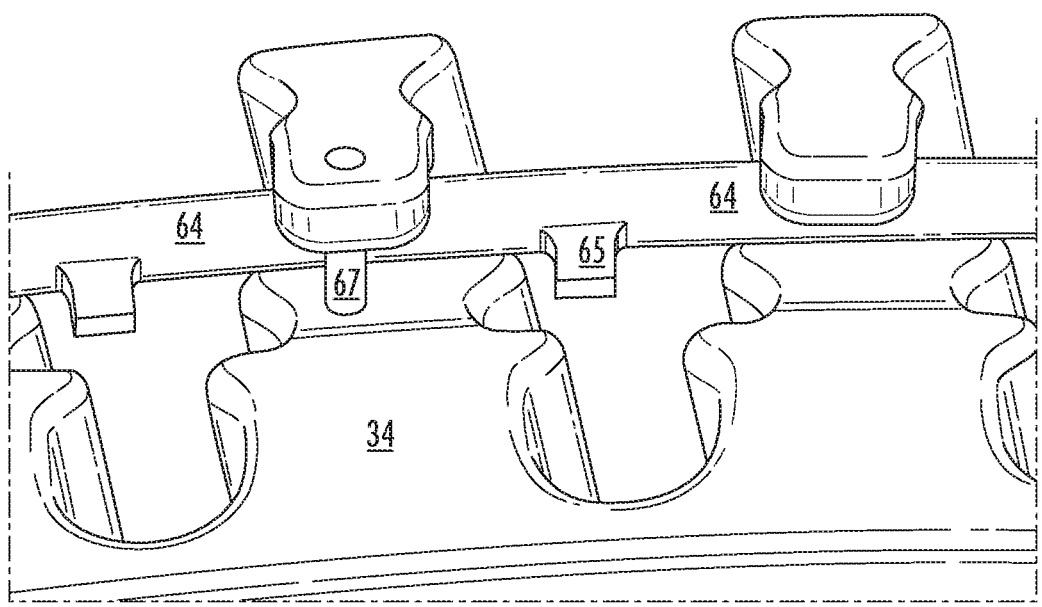
FIG. 10 illustrates a perspective radially outwardly facing view of an axial retention member positioned relative to a rotor, excluding the rotor blades, in accordance with embodiments of the present disclosure.

FIG. 10 illustrates a perspective radially outwardly facing view of axial retention member 64 positioned relative to rotor 34, excluding blade(s) 20. In some cases, axial retention member 64 further includes an anti-rotation tab 65 for engaging hook 58 (FIG. 9) and for preventing rotation of axial retention member 64 within space 66 (FIG. 9). Additionally, an anti-rotation pin 67 may be coupled to rotor 34 to prevent radial movement of axial retention member 64 within space 66.

Figure 11:
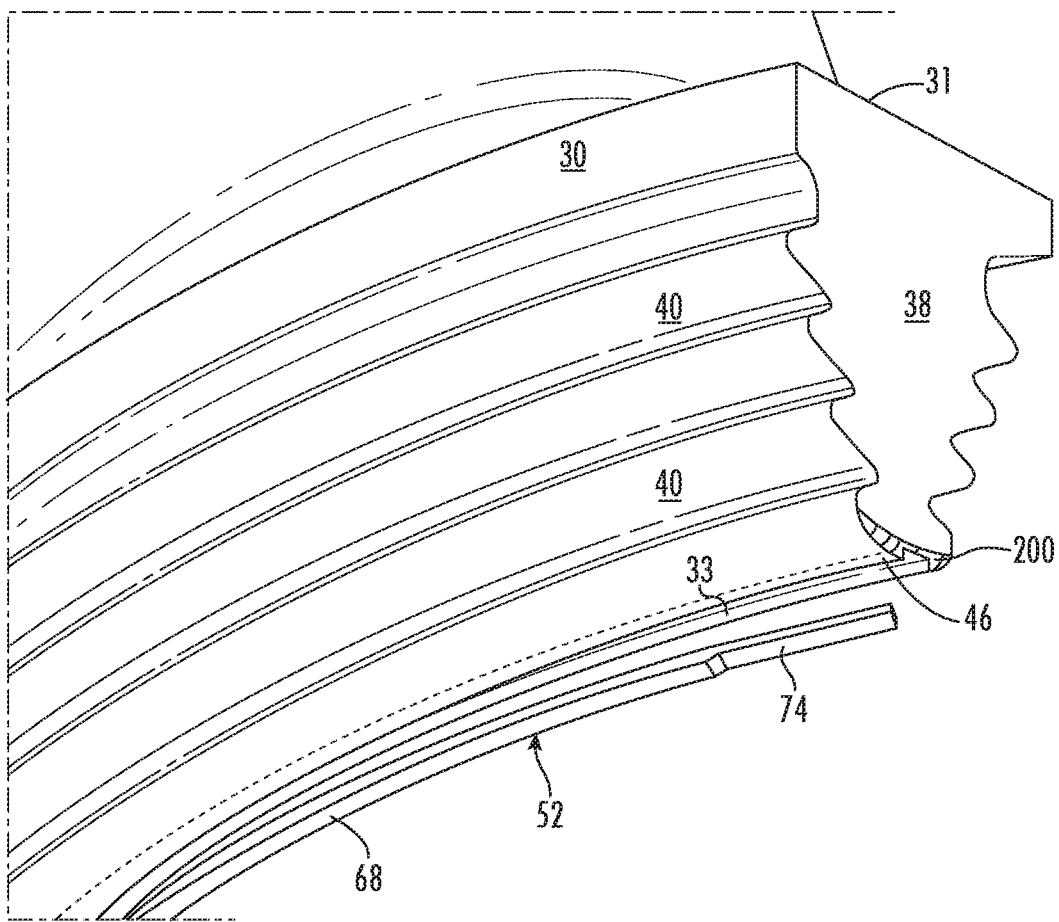
FIG. 11 illustrates a perspective blown-out view of a rotor blade dovetail and a shim in accordance with embodiments of the present disclosure.

FIGS. 11 and 12 illustrate perspective blown-out views of rotor blade 20, rotor 34, and shim 52. As shown in FIG. 11, tapered groove 33 is disposed along the radially innermost surface 46 of the dovetail 32 of rotor blade 20, which is disposed opposite the radially innermost surface 210 within the dovetail slot 36 of rotor 34. Likewise, the shim 52 may be sized to fit within the tapered groove 33 of dovetail 32 to space apart the radially innermost surface 210 of the dovetail slot 36 and the radially innermost surface 46 of the dovetail 32 such that the rotor blade 20 is properly restrained within the rotor 34 during various operations of the steam turbine 100.

In many embodiments, the shim 52 functions to provide a rigid solution that locks the dovetail 32 of the rotor blade 20 into the dovetail slot 36 of the rotor 34. Further, in various embodiments, the shim 52 may be rigid such that it retains the rotor blade 20 within the rotor 34 during operation of the steam turbine without bending, flexing, buckling or moving. In this way, the shim 52 may be advantageous over other flexible means of retaining a rotor blade 20 within the rotor 34 because it does not bend, flex, or move during operation of the steam turbine 100.

As described herein, the rotor blade 20 may be a L1 stage rotor blade 20 and/or L0 stage rotor blade 20, which means that the rotor blade 20 may be much larger and heavier when compared to rotor blades in the L2 and L3 stages. For example, the L0 and/or L1 stage rotor blade 20 may be between about 20 inches and about 30 inches in length and may have a weight of over 20 lbs. In some embodiments, the L0 and/or L1 stage rotor blade 20 may have a weight of over 100 lbs. In other embodiments, the L0 and/or L1 stage rotor blade 20 may have a weight of over 200 lbs. As such, the relatively large L0 and/or L1 stage rotor blade 20 will exert a much larger moment on the dovetail slot 36 of the rotor 34 when compared to the L2 and/or L3 stages. Thus, a flexible solution of retention, such as a spring, that would be successful in retaining a smaller L2 and/or L3 stage rotor blade is not capable of containing the relatively larger and heavier L0 and/or L1 stage rotor blades 20 due to their size and weight. Accordingly, a robust and rigid retention solution, such as the shim 52 shown and described herein, is needed to contain the large L0 and/or L1 rotor blades 20.

Figure 13:
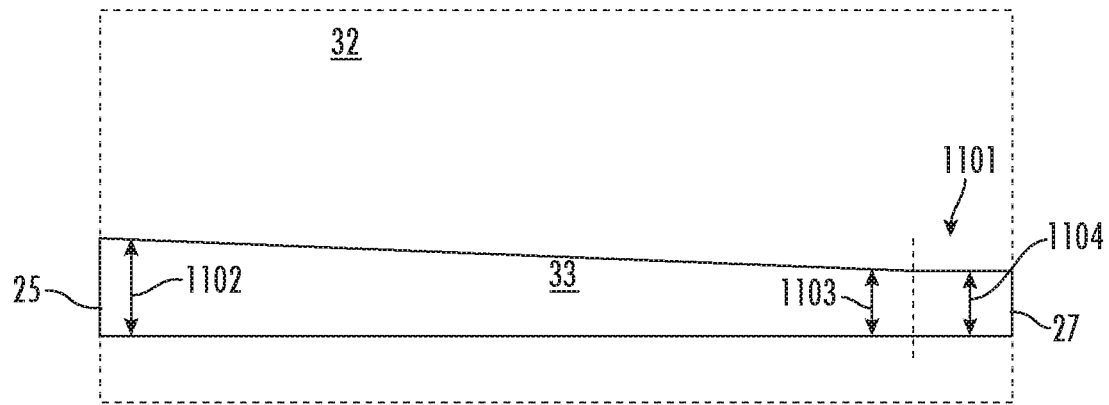
FIG. 13 illustrates a simplified cross-sectional view of a groove in accordance with embodiments of the present disclosure.

FIG. 13 illustrates a simplified cross-sectional view of tapered groove 33, according to various embodiments. As shown, the tapered groove 33 may include a flat section 1101 near the leading edge surface 25 and/or the trailing edge surface 27, where the flat section 1101 has a constant depth (i.e., it is not tapered). The depth 1102 of the tapered groove 33 at the deep end (left side of FIG. 13) is greater than the depth 1103 (and depth 1104) near the opposing end (right side of FIG. 13).

The flat section 1101 has a constant depth 1104 across its length. In some embodiments, the length of flat section 1101 may be about 3% to about 20% of the entire length of tapered groove 33. In other embodiments, the length of flat section 1101 may be about 5% to about 18% of the entire length of tapered groove 33. In various embodiments, the length of flat section 1101 may be about 7% to about 15% of the entire length of tapered groove 33. In many embodiments, the length of flat section 1101 may be about 9% to about 13% of the entire length of tapered groove 33.

The flat section 1101 facilitates disassembly/removal of the shim 52 after turbine operation and may also enable disassembly in the field without requiring the use of a cut-off tool. The flat section 1101 allows for a larger gap at the thin end of the wedge. This gap accommodates bending the thin end bend-over back to near-straight and then being able to tap the wedge towards the thick end. Without this additional gap area, the bending back of the end would form a "mushroomed" bend area and would not allow for easy disengagement of the thin end. Additionally, the flat section 1101 becomes the tertiary datum for machining and inspection of the blade as using the groove taper would not be prudent or robust.

Figure 14:
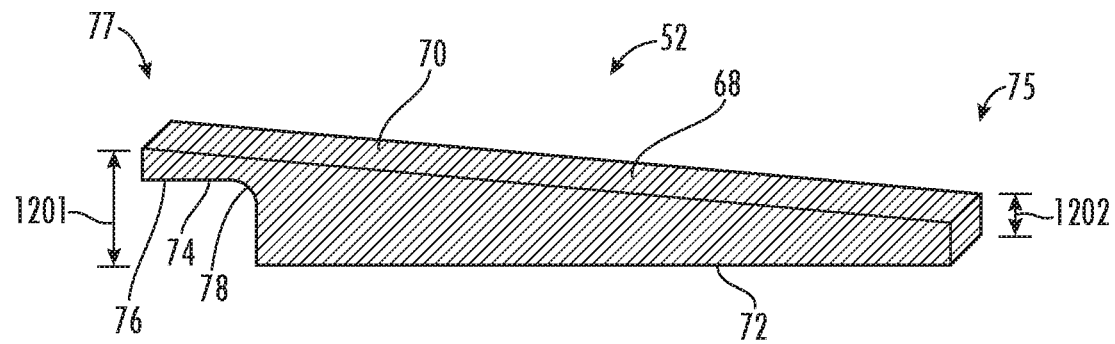
FIG. 14 illustrates a cross-sectional view of a shim in accordance with embodiments of the present disclosure.

FIG. 14 illustrates a simplified, cross-sectional view of shim 52. The shim 52 includes a thick end 77 and an opposing thin end 75, and the overall thickness gradually transitions between opposing ends. The thinned region 74 is a region of reduced thickness that enables the shim 52 to be bent over the corner 200, 202 to lock the shim 52 in place. This is particularly effective when both ends of the shim are bent over the corners 200, 202, as the shim is prevented from moving in an axial direction (with respect to the turbine). For example, a first end 75 of the shim 52 may have a first thickness 1202, and an opposing second end 77 of the shim may have a second thickness 1201, where the second thickness 1201 is greater than the first thickness 1202. The intermediate heights of the shim 52 gradually transition from the first height 1202 to the second height 1201.

As shown and described herein, the shim 52 may be tapered to exactly match the dimensions of the tapered groove 33 such that the shim is securely housed and contained within the tapered groove 33. Accordingly, the shim 52 may be tapered to allow for easy insertion of the shim 52 into the tapered groove 33. As such, the shim 52 having a taper may be advantageous over other types of shims, e.g., a flat shim, because it is easy to insert within the tapered groove 33. For example, due to the tight tolerances and substantial weight of the L0 and/or L1 rotor blade 20, insertion of a flat shim may be difficult or impossible. Thus, a tapered shim, such as the tapered shim 52 shown and described herein, may be advantageous.

In many embodiments, the shim thinned region 74 may extend from the second (thicker) end 77 to the first tapered region 78. The first tapered region 78 may transition the shim 52 from the thinned region 74 to the main body 68. In various embodiments, as shown, the shim 52 may increase in thickness from the thinned region 74 to the main body 68. In many embodiments, the main body 68 of the shim may then gradually decrease in thickness from the first tapered region 78 to the first (thinner) end 75.

Figure 15:
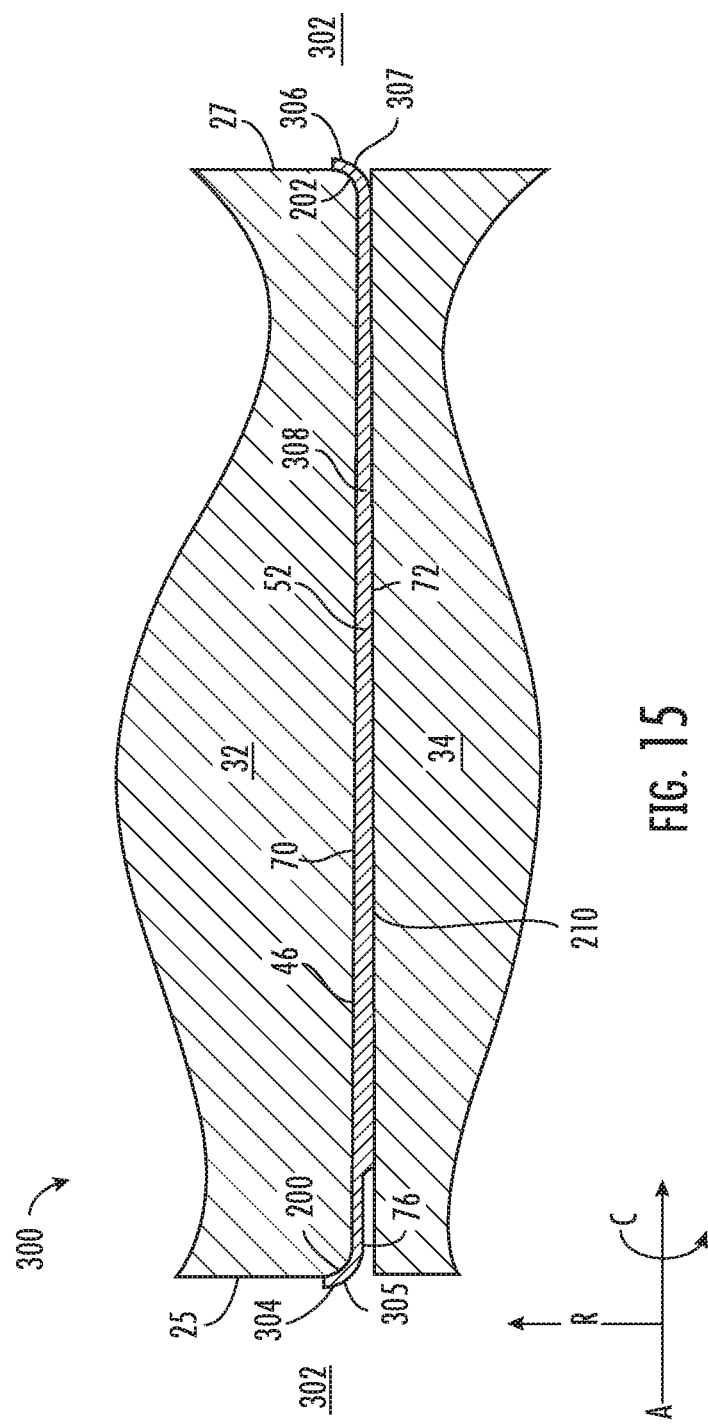
FIG. 15 illustrates a cross-sectional view of a rotor assembly in accordance with embodiments of the present disclosure.

FIG. 15 illustrates a rotor assembly 300 in accordance with embodiments of the present disclosure. As shown in FIG. 15, the shim 52 may be installed in tapered groove 33 (not shown for clarity), and the ends of the shim 52 may be bent over the corners 200, 202. With both ends of the shim 52 bent over (as shown), the shim 52 is prevented from moving axially (i.e., left or right in FIG. 15) with respect to the wheel/rotor 34. The curved and/or arcuate corners 200, 202 may advantageously reduce cold-working stress on the shim 52 when the ends are bent during installation.

As shown in FIG. 15, the dovetail 32 may include a leading edge surface 25, a trailing edge surface 27, and a radially innermost surface 46 extending therebetween. In many embodiments, a shim 52 may be positioned within a groove 33 (not shown) and between the radially innermost surface 46 of the dovetail 32 and the radially innermost surface 210 of the dovetail slot 36. As shown in FIG. 15, the shim 52 may extend at least partially radially along both of the leading edge surface 25 and the trailing edge surface 27. In many embodiments, as shown, the shim 52 may include a first radially extending portion 304 that extends along and contacts the leading edge surface 25, and a second radially extending portion 306 that extends along and contacts the trailing edge surface 27. An axially extending portion 308 may be disposed within the groove 33 and positioned between the radially innermost surface 46 of the dovetail 32 and the radially innermost surface 210 of the rotor 34 dovetail slot 36.

In various embodiments, the first radially extending portion 304, the second radially extending portion 306, and the axially extending portion 308 may extend continuously between one another. For example, the first radially extending portion 304 of the shim 52 may transition to the axially extending portion 308 of the shim 52 at a first curved portion 305. Similarly, the second radially extending portion 306 of the shim 52 may transition to the axially extending portion 308 of the shim 52 at a second curved portion 307. As shown in FIG. 15, the first curved portion 305 of the shim 52 may be disposed between the first radially extending portion 304 and the axially extending portion 308. In many embodiments, the first curved portion 305 of the shim 52 may extend along and contact the first corner 200, which is disposed between the leading edge surface 25 and the radially innermost surface 46 of the dovetail 32.

Likewise, the second curved portion 307 of the shim 52 may be disposed between the second radially extending portion 306 and the axially extending portion 308 of the shim 52. Further, the second curved portion 307 may extend along and contact the second corner 202, which is disposed between the trailing edge surface 27 and the radially innermost surface 46 of the dovetail 52. As shown and described herein, the first and the second radially extending portions 304, 306 of the shim 52 and the first and the second curved portions 305, 307 may function to advantageously provide axial retention of the dovetail 32 within the rotor 34.

As shown in FIG. 15, the first corner 200 of the dovetail 32 may be defined at an intersection between the leading edge surface 25 and the radially innermost surface 46 of the dovetail 32. Likewise, the second corner 202 of the dovetail 32 may be defined at an intersection between the trailing edge surface 27 and the radially innermost surface 46 of the dovetail 32. As shown, the first corner and the second corner 200, 202 may be curved, arcuate, and/or substantially smooth surfaces that are positioned between the generally radially oriented leading edge and trailing edge surfaces 25, 27 and the generally axially oriented radially innermost surface 46 of the dovetail 32.

The first and the second corners 200 may function to provide a smooth surface for the ends of shim 52 to be bent around during installation without cracking. The size of the radius of the corners 200, 202 is important because if, for example, the radius of the corner is too small (curve too small and angle too sharp), then the ends of the shim 52 may crack and/or break when bent over said corners 200, 202 during installation of the shim 52. Therefore, it is advantageous to have the radius of the corners 200, 202 be at least 150% of the thickness of the shim 52 at its ends. For example, in many embodiments, the radius of corners 200, 202 may be between about 150% and about 300% of the thickness of the shim 52 at its terminal ends 75, 77. In other embodiments, the radius of corners 200, 202 may be between about 175% and about 275% of the thickness of the shim 52 at its terminal ends 75, 77. In various embodiments, the radius of corners 200, 202 may be between about 200% and about 250% of the thickness of the shim 52 at its terminal ends 75, 77. In particular embodiments, the radius of corners 200, 202 may be about 225% of the thickness of the shim 52 at its terminal ends 75, 77.

It may be advantageous to machine the first and the second corners 200, 202 onto the dovetail 32 as shown, instead of, for example, the rotor 34, for a variety of reasons. In particular, machining the first and second corners 200, 202 onto the dovetail 32 instead of the rotor may have less associated risk and be more cost effective. For example, machining corners 200, 202 onto a rotor 34 may be difficult to machine due to the complex shape of the rotor 34, it may cause unwanted stress risers within the rotor 34, and it may result in scrapping of the relatively expensive rotor 34 if done incorrectly. However, machining the corners 200, 202 onto the dovetail 32 of the rotor blade 20 is much easier due to the geometry and size of the overall rotor blade 20 when compared to the rotor 34. Further, machining the corners 200, 202 onto the dovetail 32 has less associated risk when compared to the rotor 34 because the rotor blade 20 is a less expensive part to produce. Therefore, if an error were to occur during the machining of corners 200, 202, it would be much more cost effective to replace a single rotor blade 20 than the entire rotor 34.

As shown in FIGS. 14 and 15, the shim 52 may further include a radially outer surface 70, a first radially inner surface 72, and a second radially inner surface 76. As shown, the radially outer surface 70 may extend continuously along and contact the leading edge surface 25, the first corner 200, the groove 33, the second corner 202, and the trailing edge surface 27 without any gaps or spaces in contact. It is advantageous to have the radially outer surface 70 of the shim 52 have as much contact with the radially innermost surface 46 of the dovetail 32 in order to maintain retention of the shim 52 during operation of the steam turbine 32. The first radially inner surface 72 may be spaced apart from the radially outer surface 70 and may extend along the radially innermost surface 210 of the dovetail slot 36. The second radially inner surface 76 may be spaced apart from the radially outer surface 70 and the radially innermost surface 210 of the rotor 34 dovetail slot 36. As shown, the second radially inner surface 76 may not be in contact with any other surfaces, i.e., it may be exposed to ambient air.

Figure 16:
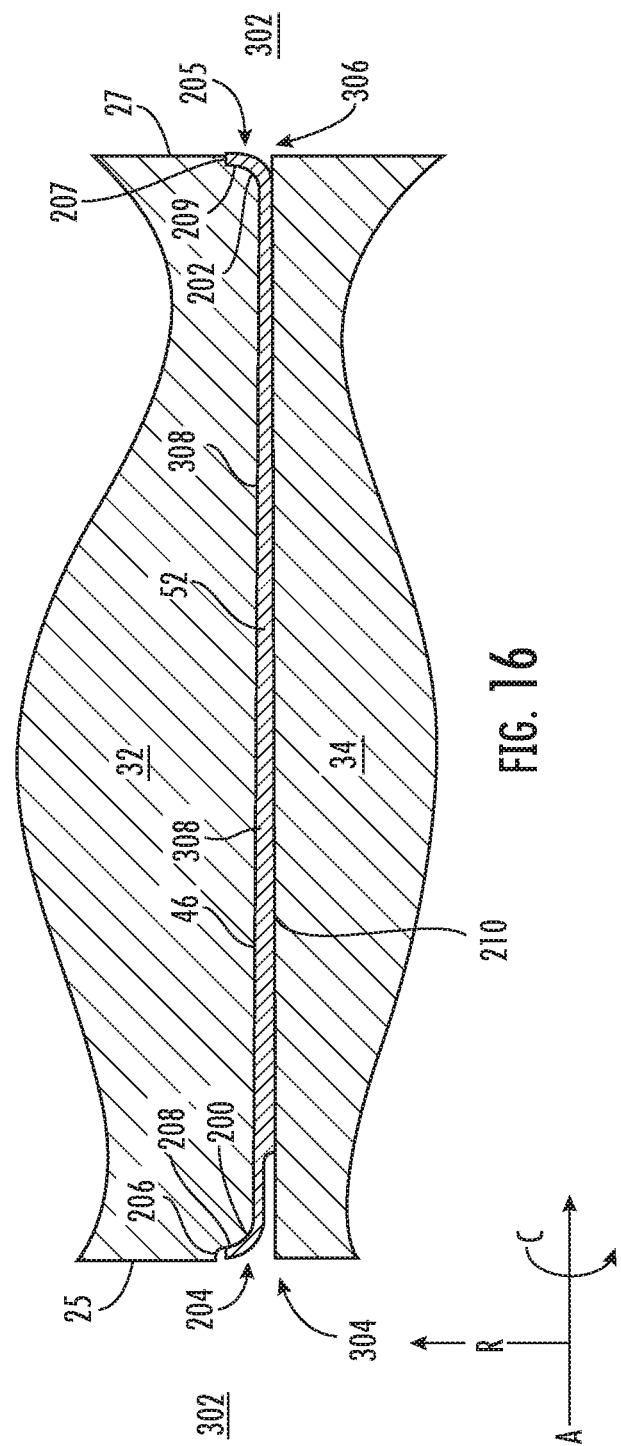
FIG. 16 illustrates a cross-sectional view of a rotor assembly in accordance with embodiments of the present disclosure.

FIG. 16 illustrates another a rotor assembly 300 in accordance with embodiments of the present disclosure. As shown, the rotor assembly 300 may further include a first axial recess 204 relative to the leading edge surface 25 and a second axial recess 205 relative to the trailing edge surface 27. In particular, each of the axial recesses 204, 205 may include an axially extending portion 206, 207 and a radially extending portion 208, 209 that intersect with one another. Specifically, the axially extending portion 206 on the leading edge side may be generally perpendicular to the leading edge surface 25 and may extend between the leading edge surface 25 and the radially extending portion 208. The radially extending portion 208 may be generally parallel to the leading edge surface 25 and may extend between the axially extending portion 206 and the first corner 200 and/or the radially innermost surface 46. Similarly, the axially extending portion 207 of the second axial recess 205 may be generally perpendicular to the trailing edge surface 27 and may extend between the trailing edge surface 27 and the radially extending portion 209. The radially extending portion 209 of the second axial recess 205 may be generally parallel to the trailing edge surface 27 and may extend between the axially extending portion 207 and the second corner 202 and/or the radially innermost surface 46.

The radially extending portions 208, 209 of the axial recess 204, 205 may be axially spaced from either the leading edge surface 25 or the trailing edge surface 27 to provide a pocket that protects the ends of shim 52 from erosion caused by a steam path 302. In this way, the portions of the shim 52 that extend along the corners 200, 202 may be advantageously positioned outside of, or away from, the steam path 302 in order to prolong the life of the shim 52 and to prevent erosion of the ends. Unwanted erosion of the ends of the shim 52 may cause the shim 52 to back out of the groove 33 (that is, to become dislodged) during operation of the steam turbine 100. Accordingly, the axial recesses 204, 205 advantageously provide a protective pocket for the radially extending portions 304, 306 and the curved portions 305, 307 that are spaced away from the steam path 302 to prevent unwanted erosion.

Figure 17:
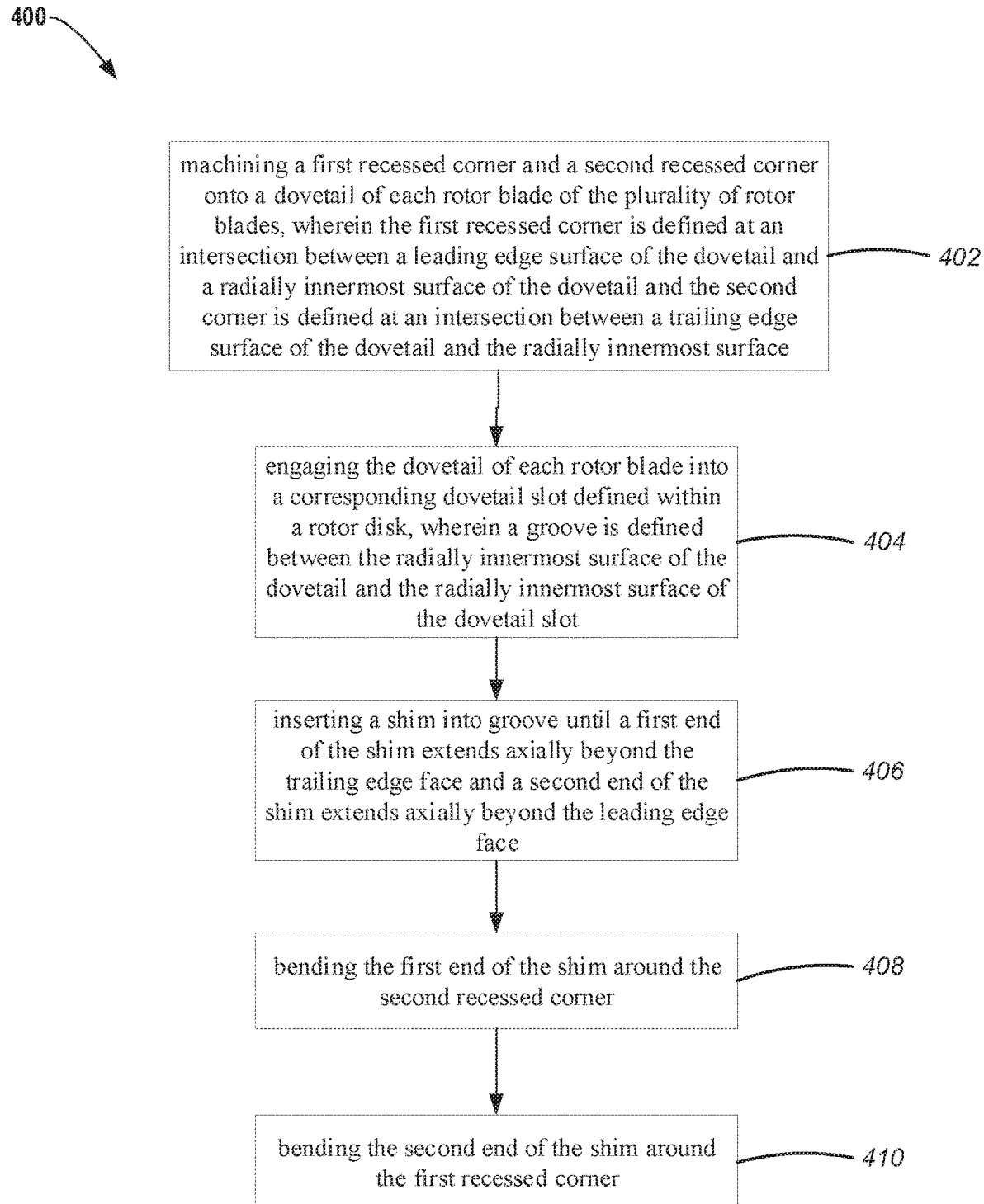
FIG. 17 is a flow chart illustrating a method in accordance with embodiments of the present disclosure.

FIG. 17 provides a flow chart, which graphically illustrates an example method 400 of installing a plurality of rotor blades within a rotor, such as the rotor blades 20 and rotor 34 described herein, in accordance with one or more example embodiments of the present disclosure. As illustrated in FIG. 17, the method 400 may include a step 402 of machining a first recessed corner 200 and a second recessed corner 202 onto a dovetail 32 of each rotor blade 20 of the plurality of rotor blades 20. The first recessed corner 200 may be defined at an intersection between a leading edge surface 25 of the dovetail 32 and a radially innermost surface 46 of the dovetail 32. The second recessed corner 202 may be defined at an intersection between a trailing edge surface 27 of the dovetail 32 and the radially innermost surface 46 of the dovetail 32.

In many embodiments, the method 400 may further include a step 404 of engaging the dovetail 32 of each rotor blade 20 into a corresponding dovetail slot 36 defined within a rotor 34. A groove 33 may be defined between the radially innermost surface 46 of the dovetail 32 and the radially innermost surface 210 of the dovetail slot 36. In various embodiments, the method 400 may also include a step 406 of inserting a shim 52 into the groove 33 until a first end 75 of the shim 52 extends axially beyond the trailing edge surface 27 and a second end 77 of the shim 52 extends axially beyond the leading edge surface 25. In many embodiments, the method 400 may further include a step 408 of bending the first end 75 of the shim around the second recessed corner 202. In some embodiments, the method 400 may include a step 410 of bending the second end 77 of the shim 52 around the first recessed corner 200. In some embodiments, the step 406 occurs before either or both of step 408 and 410, in order to ensure that the shim is fully inserted into the groove 33. The order of steps 408 and 410 may be reversed.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rotor assembly defining an axial direction, a radial direction, and a circumferential direction, the rotor assembly comprising:
   a rotor having a dovetail slot, the dovetail slot including a plurality of recesses and a first radially innermost surface;
   a shim having a main body tapering from a thick end to a thin end and a thinned portion extending from the thick end of the main body; and
   a rotor blade having a platform, an airfoil extending radially outward from the platform, and a dovetail extending radially inward from the platform, the dovetail including a plurality of projections extending in opposite directions that are received by the plurality of recesses of the dovetail slot, the dovetail comprising:
      a leading edge surface;
      a trailing edge surface;
      a second radially innermost surface; and
      a groove defined along the second radially innermost surface from the leading edge surface to the trailing edge surface, the groove having a tapered segment and a flat segment, the tapered segment extending from the leading edge surface to the flat segment, the flat segment extending from the tapered segment to the trailing edge surface, the flat segment having a constant radial depth and the tapered segment tapering from a first radial depth at the leading edge surface to a second radial depth at the flat segment, wherein the shim is positioned within the groove and between the first radially innermost surface and the second radially innermost surface, and wherein the shim extends at least partially radially along both of the leading edge surface and the trailing edge surface, wherein a first corner is defined at an intersection between the leading edge surface and the second radially innermost surface, and a second corner is defined at an intersection between the trailing edge surface and the second radially innermost surface, wherein a first radius of the first corner is between 150% and 300% of a first thickness of the shim at the thinned portion, and wherein a second radius of the second corner is between 150% and 300% of a second thickness of the shim at the thin end.

2. The rotor assembly as in claim 1, wherein the shim comprises a first radially extending portion that extends along and contacts the leading edge surface, a second radially extending portion that extends along and contacts the trailing edge surface, and an axially extending portion that is disposed within the groove and between the first radially innermost surface and the second radially innermost surface.

3. The rotor assembly as in claim 2, wherein the main body of the shim comprises a first radially inner surface that extends axially along the first radially innermost surface of the dovetail slot, and wherein the thinned portion of the shim comprises a second radially inner surface that extends axially and that is spaced apart from the first radially innermost surface of the dovetail slot.

4. The rotor assembly as in claim 1, wherein the first corner is axially recessed relative to the leading edge surface, and the second corner is axially recessed relative to the trailing edge surface.

5. The rotor assembly as in claim 4, wherein the shim is positioned in contact with the first corner and the second corner, such that the shim is outside of a steam path.

6. The rotor assembly as in claim 1, wherein the shim comprises a radially outer surface that extends along and contacts the leading edge surface, the first corner, the groove, the second corner, and the trailing edge surface.

7. The rotor assembly as in claim 1, wherein the length of the flat segment is between 3% to 20% of the entire length of the groove.

8. The rotor assembly as in claim 1, wherein the dovetail defines an axis extending from the leading edge surface to the trailing edge surface, and wherein a centerline of the dovetail is curved towards the circumferential direction with respect to the axis.

9. A turbomachine defining an axial direction, a radial direction, and a circumferential direction, the turbomachine comprising:
   at least one turbine section;
   a rotor shaft extending axially through the at least one turbine section; and
   a rotor assembly coupled to the rotor shaft, the rotor assembly comprising:
      a rotor having a dovetail slot, the dovetail slot including a plurality of recesses and a first radially innermost surface;
      a shim having a main body tapering from a thick end to a thin end and a thinned portion extending from the thick end of the main body; and
      a rotor blade having a platform, an airfoil extending radially outward from the platform, and a dovetail extending radially inward from the platform, the dovetail including a plurality of projections extending in opposite directions that are received by the plurality of recesses of the dovetail slot, the dovetail comprising:
         a leading edge surface;
         a trailing edge surface;
         a second radially innermost surface; and
         a groove defined along the second radially innermost surface from the leading edge surface to the trailing edge surface, the groove having a tapered segment and a flat segment, the tapered segment extending from the leading edge surface to the flat segment, the flat segment extending from the tapered segment to the trailing edge surface, the flat segment having a constant radial depth and the tapered segment tapering from a first radial depth at the leading edge surface to a second radial depth at the flat segment, wherein the shim is positioned within the groove and between the first radially innermost surface and the second radially innermost surface, and wherein the shim extends at least partially radially along both of the leading edge surface and the trailing edge surface, wherein a first corner is defined at an intersection between the leading edge surface and the second radially innermost surface, and a second corner is defined at an intersection between the trailing edge surface and the second radially innermost surface, wherein a first radius of the first corner is between 150% and 300% of a first thickness of the shim at the thinned portion, and wherein a second radius of the second corner is between 150% and 300% of a second thickness of the shim at the thin end.

10. The turbomachine as in claim 9, wherein the shim comprises a first radially extending portion that extends along and contacts the leading edge surface, a second radially extending portion that extends along and contacts the trailing edge surface, and an axially extending portion that is disposed within the groove and between the first radially innermost surface and the second radially innermost surface.

11. The turbomachine as in claim 9, wherein the first corner is axially recessed relative to the leading edge surface and the second corner is axially recessed relative to the trailing edge surface.

12. The turbomachine as in claim 9, wherein the shim is in contact with the first corner and the second corner, such that the shim is positioned outside of a steam path.

13. The turbomachine as in claim 9, wherein the shim comprises a radially outer surface that extends along and contacts the leading edge surface, the first corner, the groove, the second corner, and the trailing edge surface.

14. The turbomachine as in claim 9, wherein the shim comprises a first radially inner surface that extends along the first radially innermost surface of the dovetail slot and a second radially inner surface that is spaced apart from the first radially innermost surface of the dovetail slot.

15. A method of installing a plurality of rotor blades in a rotor assembly, the rotor assembly defining an axial direction, a radial direction, and a circumferential direction, the method comprising:

machining a first recessed corner and a second recessed corner onto a dovetail of each rotor blade of the plurality of rotor blades, wherein the first recessed corner is defined at an intersection between a leading edge surface of the dovetail and a radially innermost surface of the dovetail, and the second recessed corner is defined at an intersection between a trailing edge surface of the dovetail and the radially innermost surface;

engaging the dovetail of each rotor blade into a corresponding dovetail slot defined within a rotor, wherein a groove is defined between the radially innermost surface of the dovetail and the radially innermost surface of the dovetail slot, the groove having a tapered segment and a flat segment, the tapered segment extending from the leading edge surface to the flat segment, the flat segment extending from the tapered segment to the trailing edge surface, the flat segment having a constant radial depth and the tapered segment tapering from a first radial depth at the leading edge surface to a second radial depth at the flat segment;

inserting a shim into the groove until a thin end of the shim extends axially beyond the trailing edge face and a thinned portion of the shim extends axially beyond the leading edge face, the shim having a main body tapering from a thick end to the thin end and the thinned portion extends from the thick end of the main body;

bending the thin end of the shim around the second recessed corner; and bending the thinned portion of the shim around the first recessed corner, wherein a first radius of the first recessed corner is between 150% and 300% of a first thickness of the shim at the thinned portion, and wherein a second radius of the second recessed corner is between 150% and 300% of a second thickness of the shim at the thin end.

16. The method as in claim 15, wherein the step of bending the thin end of the shim around the second recessed corner results in the thin end of the shim no longer extending axially beyond the trailing edge surface, and wherein the step of bending the thinned portion of the shim around the first recessed corner results in the thinned portion of the shim no longer extending axially beyond the leading edge surface.

* * * * *